United States Patent [19]
Kitai

[11] 3,821,756
[45] June 28, 1974

[54] SHUTTER RELEASE MECHANISM WITH CHANGE-OVER DEVICE FOR FLASH PHOTOGRAPHY

[76] Inventor: Kiyoshi Kitai, 54, Tomihisa-cho, Shinjuku-ku, Tokyo, Japan

[22] Filed: Oct. 2, 1970

[21] Appl. No.: 77,421

[30] Foreign Application Priority Data
Oct. 6, 1969  Japan.............................. 44-79327

[52] U.S. Cl. .............. 95/11 R, 95/11.5 R, 95/10 C, 95/10 CT, 95/53 E
[51] Int. Cl. ........................ G03b 15/03, G03b 7/08
[58] Field of Search..... 95/11 R, 11.5, 10 C, 10 CT, 95/53 E, 53 EA, 53 EB

[56] References Cited
UNITED STATES PATENTS

| | | | |
|---|---|---|---|
| 3,416,421 | 12/1968 | Biedermann et al.............. | 95/53 EB |
| 3,433,144 | 3/1969 | Ivester ............................ | 95/11.5 X |
| 3,535,989 | 2/1968 | Kitai ................................ | 95/53 EB |
| 3,535,991 | 10/1970 | Kitai ................................ | 95/53 EB |

*Primary Examiner*—Robert P. Greiner
*Attorney, Agent, or Firm*—Robert E. Burns; Emmanuel J. Lobato; Bruce L. Adams

[57] ABSTRACT

A camera shutter release mechanism having a detector sensing and responsive to the mounting and removal of a flash device on a camera in which the shutter release mechanism is mounted. Automatic change-over means automatically change the shutter release mechanism among different modes of operation for taking a daylight exposure without use of a flash whether or not a flash device is mounted on the camera. If the brightness of the subject being photographed is adequate the flash device is not used and the exposure is taken without a flash. If the flash device is not mounted on the camera but yet brightness conditions require a flash exposure the mechanism automatically provides for a timed exposure. If the flash device is mounted and conditions require its use a flash exposure is accomplished by the change-over device in the shutter release mechanism.

8 Claims, 4 Drawing Figures

SHUTTER RELEASE MECHANISM WITH CHANGE-OVER DEVICE FOR FLASH PHOTOGRAPHY

This invention relates generally to cameras and more particularly to shutter release mechanisms having automatic change-over devices therein.

Known shutter release mechanisms are provided with change-over devices shifting the mode of operation of the camera shutter automatically. However, these known devices have limitations in that film is still wasted by over and under exposures caused by use of a flash when not required or failure to use one when required.

It is a principal object of the present invention to provide a novel and improved shutter release mechanism having a change-over device for automatically changing to different modes of operation making the correct exposure for the photography conditions obtaining.

According to the invention a shutter release mechanism is provided in which a shutter release plate is manually operable and it cooperates with a plurality of levers that coact to establish different mode of operation. Means are provided for detecting whether or not a flash device is mounted on the camera and a change-over lever automatically provides for taking an exposure using a flash if light conditions require it and not using it if not required even though the flash device is mounted on the camera. The change-over device in combination with the coacting levers and a control circuit to which a photo cell and the flash device are connected establishes a mode of operation for taking a timed or delayed exposure in the event that light conditions require it and the shutter release mechanism detects that a flash device or bulb has not been mounted on the camera.

Other features and advantages of the shutter release mechanism and flash photography change-over or switch-over device in accordance with the present invention will be better understood as described in the following specification and appended claims, in conjunction with the following drawings in which:

Figure 1:
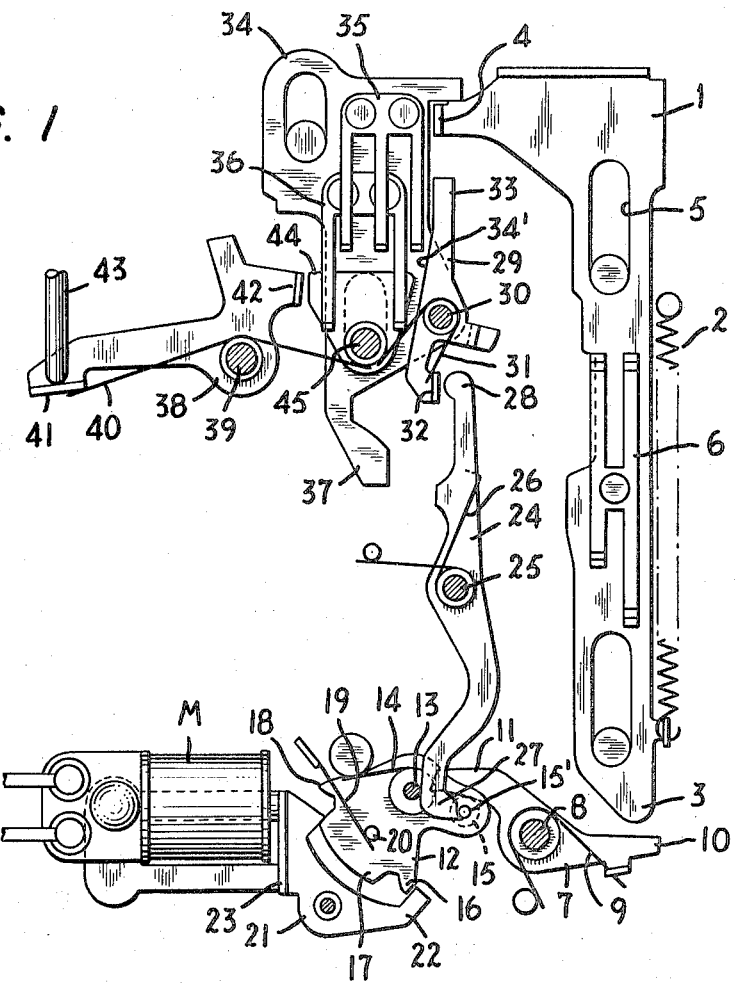
FIG. 1 is a diagrammatic illustration of a shutter release mechanism provided with a change-over device according to the invention and illustrates a mode of operation when a flash device is used.

The construction of the device of this invention will be described referring to the embodiment shown in the drawings. A shutter release plate 1 is supported so as to be movable longitudinally up and down guided by two guide grooves 5 in each of which a pin of a main body of the camera is disposed. The release plate is biased to its upper or raised position by a restoring spring 2. The lower end of the shutter release plate 1 constitutes an operating projection 3, on the upper end a side projection or bent portion provides a side projecting contact piece 4 cooperative with a three arm switch $SW_1$ later described. The release plate 1 has a contact piece 6 mounted thereon and movable therewith. A charge lever 7 is pivoted on an axis 8 and is biased in a counterclockwise direction by a spring 9. The charge lever has a projection 10 in the path of downward movement of the shutter release plate. The charge lever has another arm which constitutes an operating arm 11 engaging a pin 15 on the back surface of a driving lever 12 which is mounted on an axis 13 and has a counterclockwise force of rotation applied thereto by a spring 14. The pin 15 is thus rotated in a clockwise direction against the driving spring 14.

The driving lever 12 has a first tooth 16 of narrow width and a second tooth 17 of larger width. A third tooth 18 of small width is formed on the other side of the wider tooth and a contact point 20 is provided to bear against a contact piece 19 of a switch SW4. The teeth of the driving lever 12 are engageable with a hook 22 of a lock lever. The lock lever 21 has an armature 23 that is actuated by an electromagnet M.

On a side surface of the driving lever 12 is provided a pin 15' projecting therefrom at a central position coaxial with the pin 15. On the pin 15 there bears a hook 27 at the end of one arm of a transfer lever 24 that is mounted on a pivot 25 and has a counterclockwise rotation force applied thereto by a spring 26. The transfer lever has another or upper arm provided with an operating projection 28.

Figure 4:
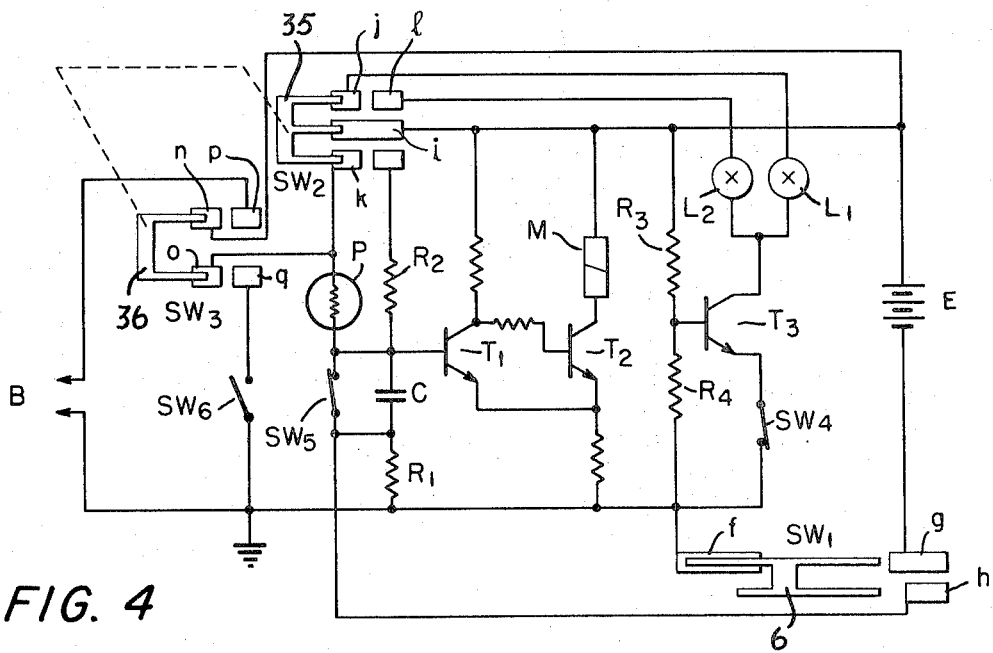
FIG. 4 is a control circuit diagram according to the invention.

A change-over plate 34 is supported by a guide groove and a pin on the camera main body, not shown, and is movable up and down parallel with the shutter release plate 1. The change-over plate is normally held in a rest position engaging a projection of the change-over plate 34 and the side projection or bent portion 4 of the release plate 1. The change over plate has a change-over lever 29 pivoted on a pivot 30. A counterclockwise rotation bias is applied to the change-over lever 29 by a weak spring 31. An upper arm 33 of the change-over lever 29 is normally kept in a rest position by contacting with a pin 34' on the change-over plate 34. The projection 32 on the change over lever disposed in a plane normal to the plane of the drawing, is engageable with the operating projection 28 of the transfer lever 24 and contacts and separates therefrom as later explained. The change-over plate 34 has fixed thereon a three-branch contact piece 35 that constitutes, FIGS. 1 and 4, a switch SW2 and a two-branch contact piece 36 that constitutes a switch $SW_3$, and on the lower end thereof is provided a control projection 37 controlling the exposure aperture for flash photography.

A flash lever 38 is pivotally mounted on the main body of the camera on an axis 39 and is biased in a clockwise direction by a spring 40. A side projection 41 at the end thereof is engaged by a flash bulb interlocking pin 43 that moves up and down by the dismounting and mounting of the flash device or bulb while another arm has a side projection 42 that contacts with and separates from the left side surface of an intermediate lever 44 that is pivotally mounted on the main body of the camera by a pivot 45. The right side surface of the intermediate lever 44 is so constituted as to engage with and disengage from the left side surface of the change-over lever 29.

The main parts of the mechanical construction of the apparatus according to the invention have been described above. Next, the electric circuit of the apparatus will be explained referring to FIG. 4. When the change-over plate 34 is in its upper position a first fixed contact $i$ contacts a central contact of the movable three-branch contact piece 35 of the switch $SW_2$ connecting a positive side of an electric power source E to an electric indicating lamp $L_1$; through a second fixed contact $j$, and through a third fixed contact $k$ and an photoelectric element P the positive side is connected with the negative side through fixed contacts $f$, $g$ of the switch $SW_1$ when a circuit is established through a timing switch $SW_5$ not shown in FIGS. 1 to 3 and a delay capacitor C, as well as through a parallel circuit of a fixed resistor $R_1$ and the fixed contacts $h$, $g$ that face the movable contact piece 6 of the switch $SW_1$ of the shutter release plate 1, and thus a detection circuit for detecting the brightness of the subject to be photographed is established. A delay circuit can be established concurrently with the detection circuit. When the change-over plate 34 moves down a resistor $R_2$ for establishing a definite time delay is connected in series with the capacitor C and connected to the positive side of the power source E by the contact piece 35 of the switch $SW_2$ and a flash operation indicating lamp $L_2$ is placed in circuit through a fixed contact 1 of the switch $SW_2$. It being understood the photo cell senses the brightness of the subject and field of the subject being photographed.

The contacts connecting the photoelectric cell or element P and the definite time delay resistor $R_2$ with the capacitor C are connected to the base of a first transistor $T_1$. The collector of this first transistor $T_1$ is connected to the base of a second transistor $T_2$ and the electromagnet M is connected to the collector of the second transistor. The collectors of both transistors $T_1$, $T_2$ are connected to the positive side of the power source E, and their emitters are connected to the negative side of the power source E through the contacts f, g and h of the three-arm switch $SW_1$.

Electric source voltage detecting resistors $R_3$, $R_4$, are connected in parallel with the collectors and emitters of the two transistors $T_1$, $T_2$. The connecting point of both voltage detection resistors $R_3$, $R_4$ is connected to the base of a third transistor $T_3$. The emitter of the third transistor is connected to the negative side of the power source E through the switch $SW_4$ on the driving lever 12, and the collector thereof is connected to the power source indicating lamp $L_1$, and the flash operation indicating lamp $L_2$.

The three-arm contact 35 of the switch $SW_2$ is interconnected with the movable contact 36 of the switch $SW_3$. The downward movement of the change-over plate 34 moves the contact piece 36 of the switch $SW_3$ so that it changes over from two fixed contacts n, o to two other fixed contacts p, q to close a flash circuit of the flash device including a synchro-switch $SW_6$.

The device of this invention is constructed as described above and its operation is as follows:

1. Operation when the brightness of the subject being photographed is high and an automatic daylight exposure is available whether a flash bulb is mounted or not.

When the shutter release plate is depressed the contact piece 6 of the switch $SW_1$ closes first the contacts $f$, $g$. In this case, since the switch $SW_4$ is closed the voltage of the power source E is detected by the power source voltage detecting resistors $R_3$, $R_4$, and if this is above a selected definite voltage the third transistor $T_3$ becomes conductive and the power source indicating lamp $L_1$ is lighted to indicate capability of operation. At the same time, a series circuit of the photoelectric element P and a fixed resistor $R_1$ is formed and the value of the resistance of the photoelectric element P, this resistance corresponds to and is a function of the brightness of the subject being photographed, and the resistance of the fixed resistor $R_1$ is compared. If the brightness of the subject being photographed is higher than a definite value the first transistor $T_1$ becomes conductive and the second transistor $T_2$ becomes non-conductive to demagnetize or deenergize the electromagnet M. The hook 22 of the lock lever 21 is then free from the electromagnet M and the driving lever 12 is enabled to rotate by the disengagement of the first tooth 16 and, by the depressing of the shutter release plate 1. The driving lever 12 is rotated in a counterclockwise direction following the rotation of the charge lever 7.

Figure 2:
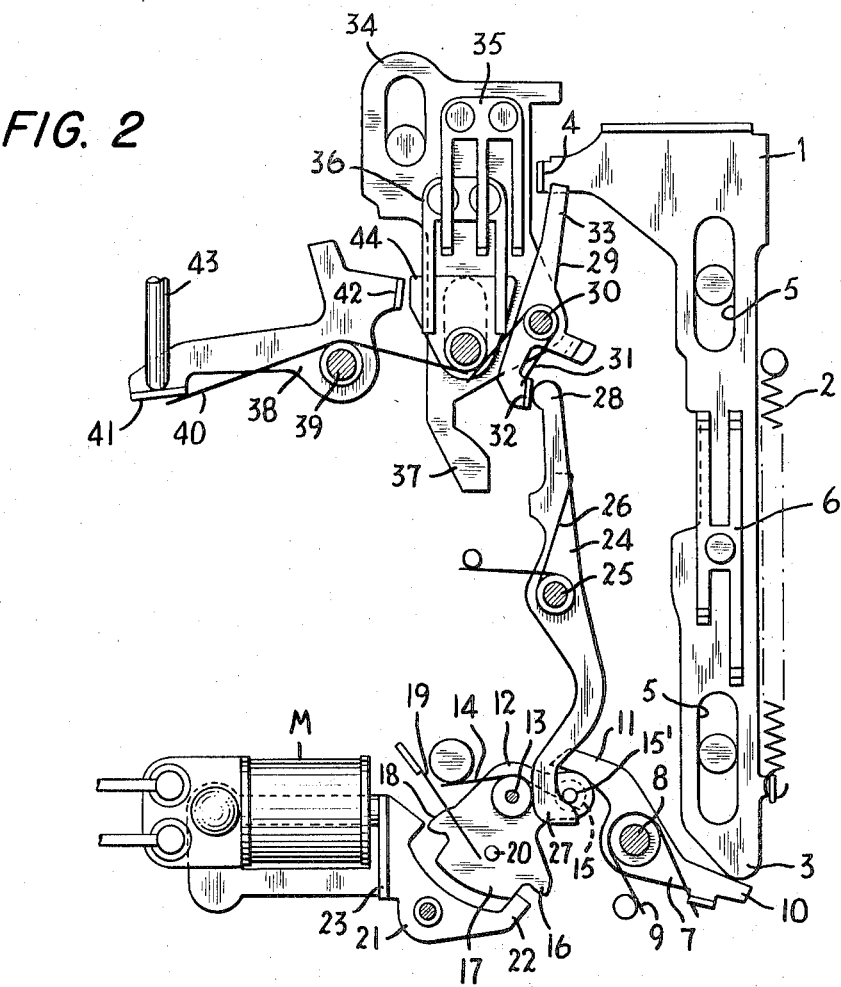
FIG. 2 is a diagrammatic illustration of the mechanism in FIG. 1 illustrating a mode of operation in which a flash device is mounted on the camera and light conditions are adequate for a flashless exposure.

At the same time, the switch $SW_4$ is opened and the shutter release mechanism assumes a condition illustrated in FIG. 2. Then, the power source indicating lamp $L_1$ is turned off and the shutter release plate 1 is depressed by the amount of rotation of the driving lever 12. The contact piece 6 of the switch $SW_1$ closes the fixed contacts $f$, $g$, $h$ so that the fixed resistor $R_1$ is short-circuited. The base voltage of the first transistor $T_1$ drops to make the first transistor $T_1$ non-conductive, while the second transistor $T_2$ condition is changed and it becomes conductive and the electromagnet is energized causing the second tooth 17 of the driving lever 19 to be stopped by the hook 22.

Figure 3:
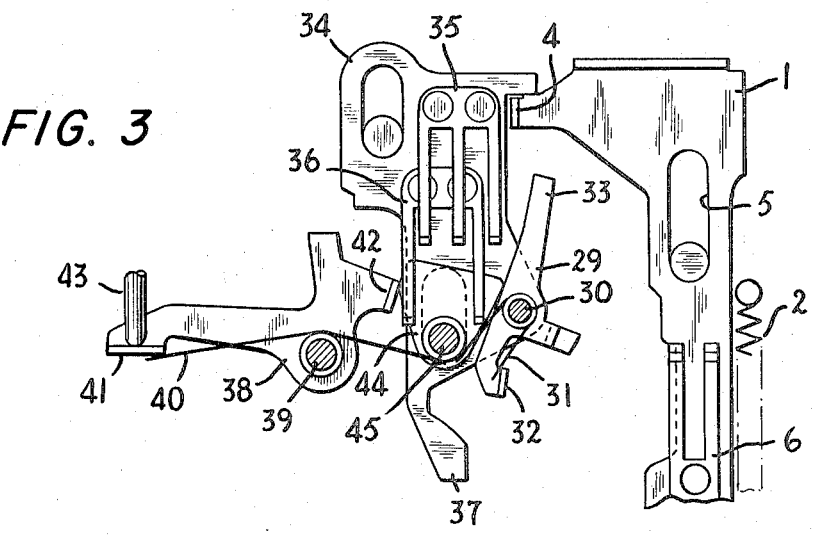
FIG. 3 is a fragmentary diagrammatic illustration of the shutter release mechanism in FIG. 1 and illustrates a condition in which a flash device has not been mounted on a camera and a timed exposure is to be taken.

In this state of the operation the transfer lever 24 with the end hook 27 engaged with the pin 15 rotates counterclockwise. The operating projection 28 of the transfer lever pushes the side projection 32 of the change-over lever 29 to make the change-over lever 29 rotate, so that its upper arm 33 rotates clockwise and recedes from the path of downward travel of the bent portion 4 of the shutter release plate 1, then, even if the shutter release plate 1 moves downwardly its interlinkage with the change-over plate 34 is interrupted, and the change-over plate 34 stops at the position illustrated in FIG. 2 without movement. Consequently, as the mechanically interlinked switches $SW_2$ and $SW_3$ keep fixed contacts j, k and n, o energized respectively, the photoelectric element remains connected to the power source E as it is and the flash circuit keeps its open circuit condition. When the shutter release plate 1 is further depressed the timing switch $SW_5$, not shown in FIGS. 1 to 3, is opened, the capacitor C is connected to the photoelectric cell or element in series. Charging of the capacitor is started as the shutter is opened, and when charged up to a definite voltage the first transistor $T_1$ is rendered conductive and the second transistor $T_2$ is rendered non-conductive to deenergize the electromagnet M. When the deenergization takes place the driving lever 12 starts from the second tooth to close the shutter according to the brightness of the subject being photographed.

Therefore in this case, even though a flash bulb is mounted on a camera, not shown, a flash is not emitted and an automatic natural light exposure is performed when the shutter release lever is actuated.

2. Operation when the brightness of the subject being photographed is lower than a definite level to allow the flash photography to be performed and a flash bulb is normally mounted.

As shown in FIG. 1, by installing a flash device, the bulb interlinking pin 43 moves down and presses the projection 41 of the flash lever 38 downwardly to make the flash lever 38 rotate counterclockwise. Then the side projection 42 of the flash lever stops the pushing force of the intermediate lever 44 and the change-over lever 29 becomes freed of the pushing by the intermediate lever 44, so that the upper arm 33 of the change-over lever 29 takes a position in the path of downward movement of the bent portion 4 of the shutter release plate 1. When the shutter release plate 1 is depressed under such a condition, whether the power source voltage E is normal or not is checked by the power source indicating lamp $L_1$ similarly as in the prior described case (1).

At the same time, a series circuit of the photoelectric cell or element P sensing the ambient light of the field to be photographed and the fixed transistor $R_1$ is formed and comparing the value of resistance of the photoelectric element P, corresponding to the brightness of the subject being photographed, and the resistance of the fixed resistor $R_1$ takes place. If the brightness of the subject being photographed is lower than a definite value the first transistor $T_1$ is rendered nonconductive and the second transistor $T_2$ becomes conductive to excite the electromagnet M, so that the driving lever 12 is stopped with its first tooth 16 engaged by the lock lever 21. Even though the charge lever 7 is rotated in a clockwise direction by the shutter release plate 1, the driving lever 12 is at rest, the switch $SW_4$ remains in a closed state, and the power source indicating lamp $L_1$ remains lighted. Then since the transfer lever 24 also does not rotate, the upper arm 33 of the change-over lever 29 remains in the path of downward movement of the bent portion 4 of the shutter release plate 1.

As the shutter release plate 1 is further depressed the switch $SW_1$ closes the fixed contacts f, g, h and the fixed resistor $R_1$ is short-circuited. Then, since the upper arm 33 of the change-over lever 29 and the bent portion 4 of the shutter release plate 1 make contact, the change-over plate 34 is caused to move down. The control projection 37 thereof acts on the iris mechanism of the camera shutter, not shown, to form the necessary iris or aperture for a flash exposure. At the same time, the switch $SW_2$ closes the fixed contacts points i, l, m; the power source indicating lamp $L_1$ is turned off, and the flash operation indicating lamp $L_2$ is lighted to inform the photographer of the availability or possibility of effecting a flash exposure. At the same time the photoelectric cell or element P is placed out-of-circuit from the power source and instead the definite time delay resistor $R_2$ is connected. In such a condition, since the capacitor C and the series resistor $R_1$ are short-circuited respectively by the switches $SW_5$ and $SW_1$ the first transistor $T_1$ is still non-conductive while the second transistor $T_2$ is conductive, hence the electromagnet M is excited and the driving lever 12 is stopped by the hook 22 of the hook lever 21.

When the shutter release plate 1 is further depressed the shutter, not shown, is released and begins to open. As the shutter is opened further the timing switch $SW_5$ is also opened, and the capacitor C begins to be charged by the current that flows through the delay resistor $R_2$ for definite time delay. After lapse of the time, the synchro-switch $SW_6$ is closed, and the flash device connected at B makes an emission. And after the shutter is opened for a definite time (about 1/30 sec.), the first transistor $T_1$ becomes conductive, while the second transistor $T_2$ becomes nonconductive, then the driving lever 12 is rotated to close the shutter, resulting in the execution of a flash exposure.

3. Operation when the brightness of the subject being photographed is lower than a definite level and flash exposure conditions obtain but the flash device or bulb is not installed on the camera.

As shown in FIG. 3, when a flash device or bulb is not ready mounted for photographing the interlocking pin 43 does not push down the flash lever 38. The flash lever 38 is rotated clockwise by the biasing spring 40 to urge the intermediate lever 44 to move clockwise, so that the intermediate lever 44 makes the change over lever 29 rotate clockwise somewhat similarly as in Case (1) in which the transfer lever 24 makes the change-over lever 29 rotate clockwise. The upper arm 33 of the change-over lever is made as beforehand to move away from the path of downward movement of the bent portion 4.

Thus, if the shutter release plate 1 is depressed, since the change-over plate 34 is at rest, the switches $SW_2$ and $SW_3$ do not change over. The flash circuit is opened, the photoelectric element P remains connected in the delay circuit, and when the shutter is released and the timing switch $SW_5$ is opened the capacitor C is charged by the current flowing through the photoelectric cell or element P in a high resistance state. When the capacitor C attains a definite voltage after a relatively long time, the electromagnet M is demagnetized by the effect of the paired transistors $T_1$, and $T_2$. The driving lever 12 starts from its first tooth 16, and then a long time exposure is made possible.

The invention makes possible operation modes as mentioned above: Even if a flash bulb is mounted and the brightness of the subject being photographed is suitable for an automatic natural light exposure a natural light exposure can be automatically performed without lighting the bulb; when the brightness of the subject being photographed is suitable for flash photography, the exposure time is changed over to a time suitable for a flash exposure simultaneously when setting the mechanism for flash emission; and even in case the conditions are those for a flash exposure but the flash bulb is not mounted on the camera it is possible to perform a long time exposure corresponding in time to the brightness of the subject being photographed. Thus useless consumption of flash bulbs is prevented and, even if a flash bulb is not on hand, a long time exposure can be performed. It can be seen, therefore, that the shutter release mechanism of this invention enables a photographer to avoid useless consumption of film as well as to carry out photography with ease.

What I claim and desire to secure by Letters Patent is:

1. For use in a camera, a shutter release mechanism comprising, means mounted in use in a camera to effect release of a camera shutter for effecting an exposure comprising means responsive to the mounting of a flash device on the camera and the removal therefrom, automatic change-over means cooperative with the last-mentioned means to automatically change the shutter release mechanism among different modes of operation comprising first automatic means to effect release of the shutter for taking a daylight exposure without use of a flash in dependence upon the brightness of the subject being photographed and whether or not a flash device is mounted on the camera, second automatic means including a part of said first automatic means to release the camera shutter to automatically effect a flash exposure and effecting selection of a flash exposure in dependence upon the brightness of the subject being photographed, third automatic means including a part of said first and second automatic means for effecting release of the shutter effecting automatically a time exposure when the brightness of the subject being photographed requires a flash exposure and a flash device is not mounted on the camera, the first-mentioned means including a manually actuated shutter release member operable to cooperate with said automatic change-over means to initiate change-over among said different modes of operation, and said means responsive to the mounting and removal of said flash device comprises a movable sensor operable to different positions in response to mounting of a flash device on the camera and the removal therefrom.

2. For use in a camera a shutter release mechanism according to claim 1, in which said shutter release member comprises a plate operable manually, and which said first, second, and third automatic means comprise a control circuit, a photocell in said circuit sensing the brightness of a subject to be photographed, output means for energizing a flash device, a power source to energize said circuit, and means to make and break the circuit, and means to render energization of the flash device ineffective when a flash device is connected to said circuit and the photocell senses the brightness of the subject being photographed is sufficient as to not require a flash exposure.

3. For use in a camera, a shutter release mechanism comprising, means mounted in use in a camera to effect release of a camera shutter for effecting an exposure comprising means responsive to the mounting of a flash device on the camera and the removal therefrom, automatic change-over means cooperative with the last-mentioned means to automatically change the shutter release mechanism among different modes of operation comprising first automatic means to effect release of the shutter for taking a daylight exposure without use of a flash in dependence upon the brightness of the subject being photographed and whether or not a flash device is mounted on the camera, second automatic means including a part of said first automatic means to release the camera shutter to automatically effect a flash exposure and effecting selection of a flash exposure in dependence upon the brightness of the subject being photographed, third automatic means including a part of said first and second automatic means for effecting release of the shutter effecting automatically a time exposure when the brightness of the subject being photographed requires a flash exposure and a flash device is not mounted on the camera, the first-mentioned means including a manually actuated shutter release member operable to cooperate with said automatic change-over means to initiate change-over among said different modes of operation, said shutter release member comprising a plate operable manually, and said first, second, and third automatic means comprising a control circuit, a photocell in said circuit sensing the brightness of a subject to be photographed, output means for energizing a flash device, a power source to energize said circuit, means to make and break the circuit, means to render energization of the flash device ineffective when a flash device is connected to said circuit and the photocell senses that the brightness of the subject being photographed is sufficient as to not require a flash exposure, said control circuit including an electromagnet, switches in said circuit, said first, second, and third automatic means including a plurality of coactive levers opening and closing selected ones of said switches, a change-over lever cooperative with said plurality of levers operable to two positions for selecting modes of coaction of the levers of said plurality of levers, thereby to select said modes of operation, and said plurality of levers making some of said switches thereon.

4. For use in a camera a shutter release mechanism according to claim 3, in which said plurality of biased, coactive levers comprising an intermediate transfer lever interlinking operation of the change-over lever and the shutter release member, and a driving lever controlled by said electromagnet for driving said transfer lever.

5. A shutter and flashlight actuating mechanism for a photographic camera comprising, change-over means movable between first and second positions for respectively setting the camera for flashlight and natural light photography, a manually operable member for initiating operation of the shutter, a driving member following the operation of the manually operable member before releasing of the shutter, an electromagnet controlling movement of the driving member, an electric circuit having a plurality of switches and a photoelectric device for controlling operation of the electromagnet and thereby controlling operation of the driving member, a movable part positionable in a first position where said movable part is not able to engage with said manually operable member and in a second position where said movable part is able to engage with said manually operable member, means positioning said movable part being in its second position when the ambient light level is above a predetermined value and in its first position when the light is below the said predetermined value, thereby after operation of the manually operable member and before releasing of the shutter the said movable part is disposed respectively in its first or in its second position.

6. A mechanism as claimed in claim 5, in which said driving member is movable to a position to close the shutter.

7. A mechanism as claimed in claim 5, in which the changeover means and manually operable member respectively control the operation of different switches in the electric circuit.

8. A mechanism as claimed in claim 5, in which means positioning said movable part in its second position includes a flashlight device sensing member whose position varies in dependence upon the presence or absence of a flashlight device, and further includes abutment means movable by the sensing member into and out of a position in which said movable part is forced thereby into its second position.

* * * * *